No. 864,504. PATENTED AUG. 27, 1907.
F. J. BENNETT.
CASTER FOR FISHING LINES.
APPLICATION FILED APR. 23, 1907.
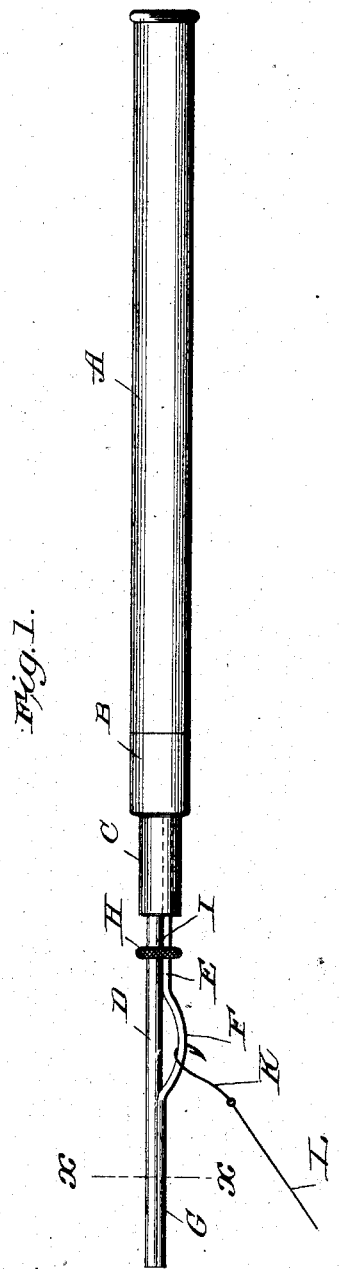
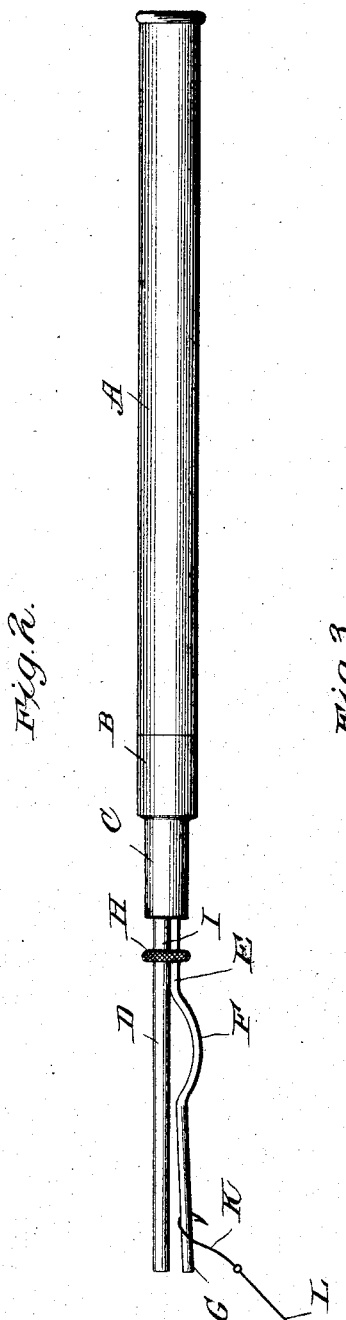
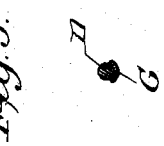
Witnesses
Geo. Ackman
Frank Hough
Inventor
Fred J. Bennett
by James J. Anderson
his Attorney
THE NORRIS PETERS CO., WASHINGTON, D. C.

UNITED STATES PATENT OFFICE.

FRED J. BENNETT, OF AUBURN, NEW YORK.

CASTER FOR FISHING-LINES.

No. 864,504.  Specification of Letters Patent.  Patented Aug. 27, 1907.

Application filed April 23, 1907. Serial No. 369,854.

*To all whom it may concern:*

Be it known that I, FRED J. BENNETT, a citizen of the United States, residing at 58 Pulsifer street, Auburn, in the county of Cayuga and State of New York, have invented certain new and useful Improvements in Casters for Fishing-Lines, of which the following is a specification.

My invention relates to fishing tackle, more particularly to a caster for a fishing line and it has for its purpose to provide a device of that character whereby one is enabled to throw his line a distance of many feet and thus avoid the necessity of making the usual wide sweep with the fishing rod; or if it be a hand line, to do away with the dangerous and inconvenient swing of the same about the head or otherwise.

My further aim is to accomplish these results by providing a line caster which shall require no skill for manipulation but instead may readily be used by anyone ordinarily experienced in fishing.

A still further object is in so constructing the device that it shall embody the combined features of durability and neatness, and which shall be cheap of manufacture. Its length is such that it may be conveniently carried by being tied to the dissembled sections of a fishing rod.

In the accompanying drawing which forms a part of this specification, Figure 1, is a side elevation of the caster with a line attached. Fig. 2, is a similar view showing the line being cast, and, Fig. 3, is a section taken on the line x—x of Fig. 1.

Referring now more particularly to the drawings in which like letters of reference designate corresponding parts in the different views shown A is the handle of the line-caster which may be made of any suitable material, but preferably of wood.

B is a ferrule of approximately the same diameter as the handle A, and C is a narrower portion thereof that covers the reduced end of the handle. Fitting within this reduced portion and lengthwise with the grain thereof is the rod D that may be of any rigid metal, and which is approximately four or five inches long.

E designates a resilient member that is fastened immediately against the rod D within the reduced end of the handle A, and which is likewise of equal length with said rod. The function of the resilient clip E is to retain the hook K of the line L ready for throwing for which purpose it is bent to provide a loop or eye at a point about an inch or two from the end of the ferrule, as shown at F. From the eye portion F to its free end, designated by G, the resilient clip is substantially convex-concavo in cross section, the concave face thereof fitting closely about the contour of the rod D. The purpose of this structure is to lend additional strength to the member E for holding the hook K securely within the loop F until the proper moment that it should be released for casting; and it likewise serves to prevent the hook from being pulled out of the loop F by the weight of the line when it is being gotten ready for throwing.

In using lines of various weights the degrees of tension upon the hook retaining member would be varied accordingly and in order to regulate this so as to be proportionally uniform I have provided a tension regulator H, which is a ring adapted to encircle the rod D and the spring rod E within the space between the loop E' and the end of the handle, said ring has a roughened outer surface and is adapted to hold by friction against the rods D and E, and to adjust the tension between those members it may be moved to any point within the space aforesaid.

In operation my line caster works as follows. The hook K of the line L having been placed within the loop F, as shown in Fig. 1, and sufficient cord having been drawn, the handle A is then given a quick jerk forward which carrying the line and sinker in that direction causes the hook to slip free from between the rod D and clip G as illustrated in Fig. 2.

What I claim as new and desire to secure by Letters Patent is,—

1. A line caster of the character described comprising a handle having a line attaching means at one end thereof, said means comprising a rigid and a resilient member.

2. A line caster of the character described comprising a handle having a line attaching means at one end thereof, said means being adapted to automatically release said line.

3. A line caster of the character described comprising a handle, a line attaching means at one end thereof comprising a rigid member and a resilient member, said members being adapted to automatically release said line.

4. A line caster comprising a handle, a line attaching means at one end of said handle, said means comprising a rigid member, and a resilient member adjacent said rigid member.

5. A line caster comprising a handle, a line attaching means at one end thereof, said means comprising a rigid member and a resilient member, and a means for regulating the tension between said members.

6. A line caster comprising a handle, a line attaching means at one end thereof, said means comprising a rigid member and a resilient member, a tension regulator for said members, and a hook securing means on one of said members.

7. A line caster comprising a handle, a line attaching means at one end thereof, said means comprising a resilient member and a rigid member, said resilient member adapted to fit against the rigid member, and a tension regulator encircling said members.

8. A line caster comprising a handle, a line attaching means at one end thereof, said means comprising clip and a rigid member, said clip adapted to fit against the rigid member, said clip providing a hook opening, and a tension regulator for said clip between the hook opening and the handle.

9. In a line caster of the character described comprising, a handle, a line attaching means at one end thereof, a tensioning means for said line attaching means said tensioning means adapted to be regulated for throwing said line predetermined distances.

In testimony whereof I hereby affix my signature in presence of two witnesses.

FRED J. BENNETT.

Witnesses:
G. EARLE TREAT,
FRANK A. JAYNE.